United States Patent [19]

Buckley

[11] Patent Number: 5,550,454
[45] Date of Patent: Aug. 27, 1996

[54] CHARGING REGIME FOR SECONDARY LITHIUM BATTERIES

[76] Inventor: James P. Buckley, 21063 Red Fir Ct., Cupertino, Calif. 95014

[21] Appl. No.: 190,762

[22] Filed: Feb. 2, 1994

[51] Int. Cl.⁶ ................................................. H01M 10/44
[52] U.S. Cl. ................................................. 320/22; 320/30
[58] Field of Search ................................. 320/2, 22, 21, 320/30, 39, 40, 43, 44, 45, 48

[56] References Cited

U.S. PATENT DOCUMENTS

| | | | |
|---|---|---|---|
| 4,247,499 | 1/1981 | Glugla et al. | 264/104 |
| 4,388,385 | 6/1983 | Sekido et al. | 429/111 |
| 4,394,280 | 7/1983 | von Alpen et al. | 252/62.2 |
| 4,414,607 | 11/1983 | Sekido et al. | 361/433 |
| 4,432,891 | 2/1984 | Susman et al. | 252/518 |
| 4,539,276 | 9/1985 | Harbach | 429/191 |
| 4,557,985 | 12/1985 | Voss | 429/191 |
| 4,830,939 | 5/1989 | Lee et al. | 429/192 |
| 4,908,283 | 3/1990 | Takahashi et al. | 429/192 |
| 5,037,712 | 8/1991 | Shackle et al. | 429/192 |

OTHER PUBLICATIONS

Abraham et al., "Solid–State Rechargeable Lithium Batteries Utilizing Polyphosphazene–based Polymer Electrolytes," IEEE 1990.

Primary Examiner—Peter S. Wong
Assistant Examiner—Edward Tso

[57] ABSTRACT

A method for extending the cycle life of a solid, secondary lithium electrochemical cell is disclosed. The method increases the ability of an electrochemical cell to retain at least one-half of its initial charge capacity over many charge-discharge cycles. This objective is achieved by the use of certain non-uniform charging currents. In one aspect, the method relates to rapidly charging a discharged solid lithium secondary cell or battery, that has an active surface area S and that had an initial charge capacity $Q_0$ and cycle life $\eta_0$ prior to being discharged wherein $Q_0$ was established by applying a constant current $I_0$ over a length of time $T_0$ such that $Q_0 = SI_0T_0$, which comprises the step of applying several charging currents, $I_k$, to the cell or battery wherein each $I_k$ is applied for a time period, $T_k < T_0$, such that $$Q_0 = S \sum_{k=1}^{m} I_k T_k$$

where k is an integer from 1 to m representing the time serial order of charging steps in one charging one-half cycle, and m is an integer greater than one representing the charging steps in one charging one-half cycle.

24 Claims, 3 Drawing Sheets

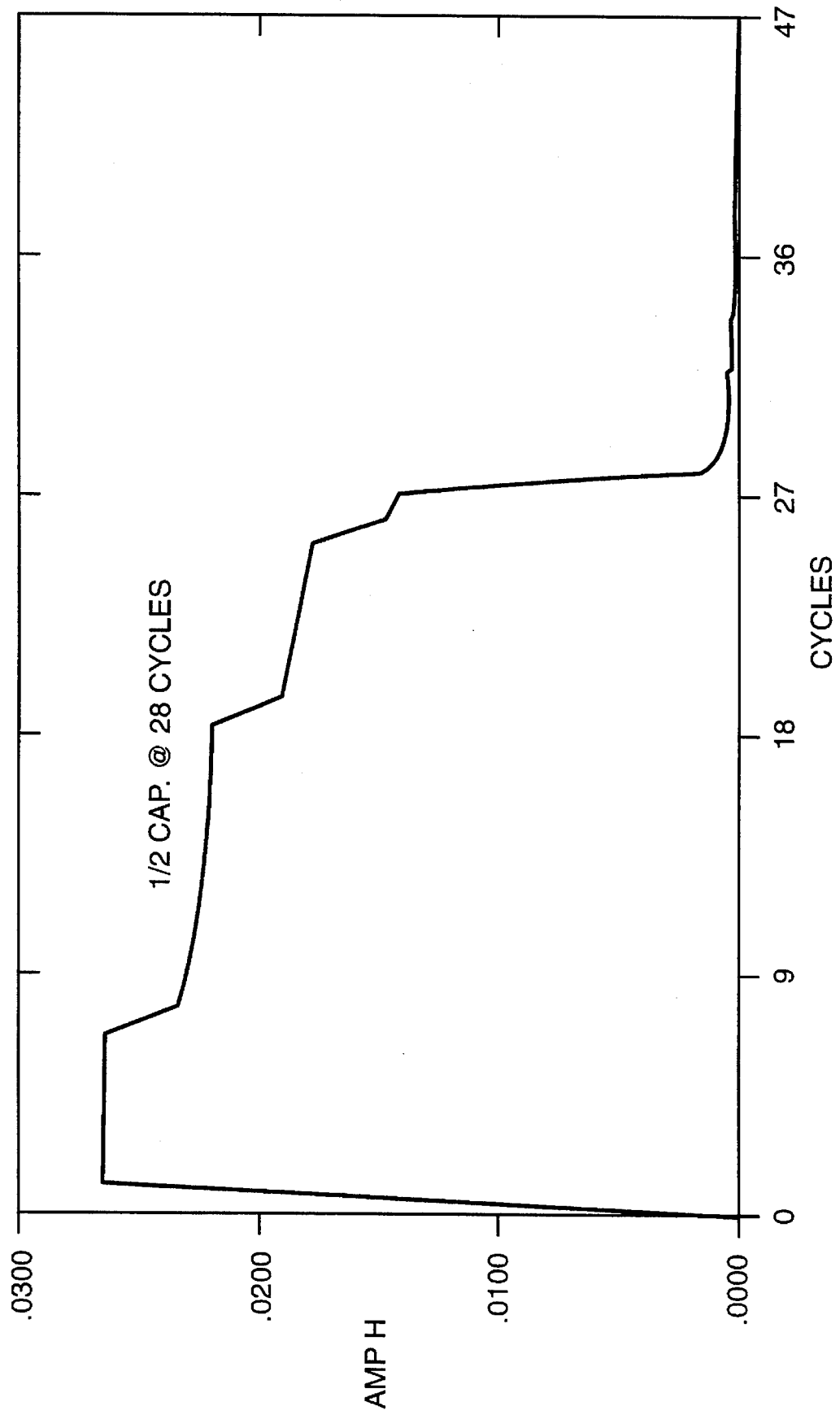
FIG._1

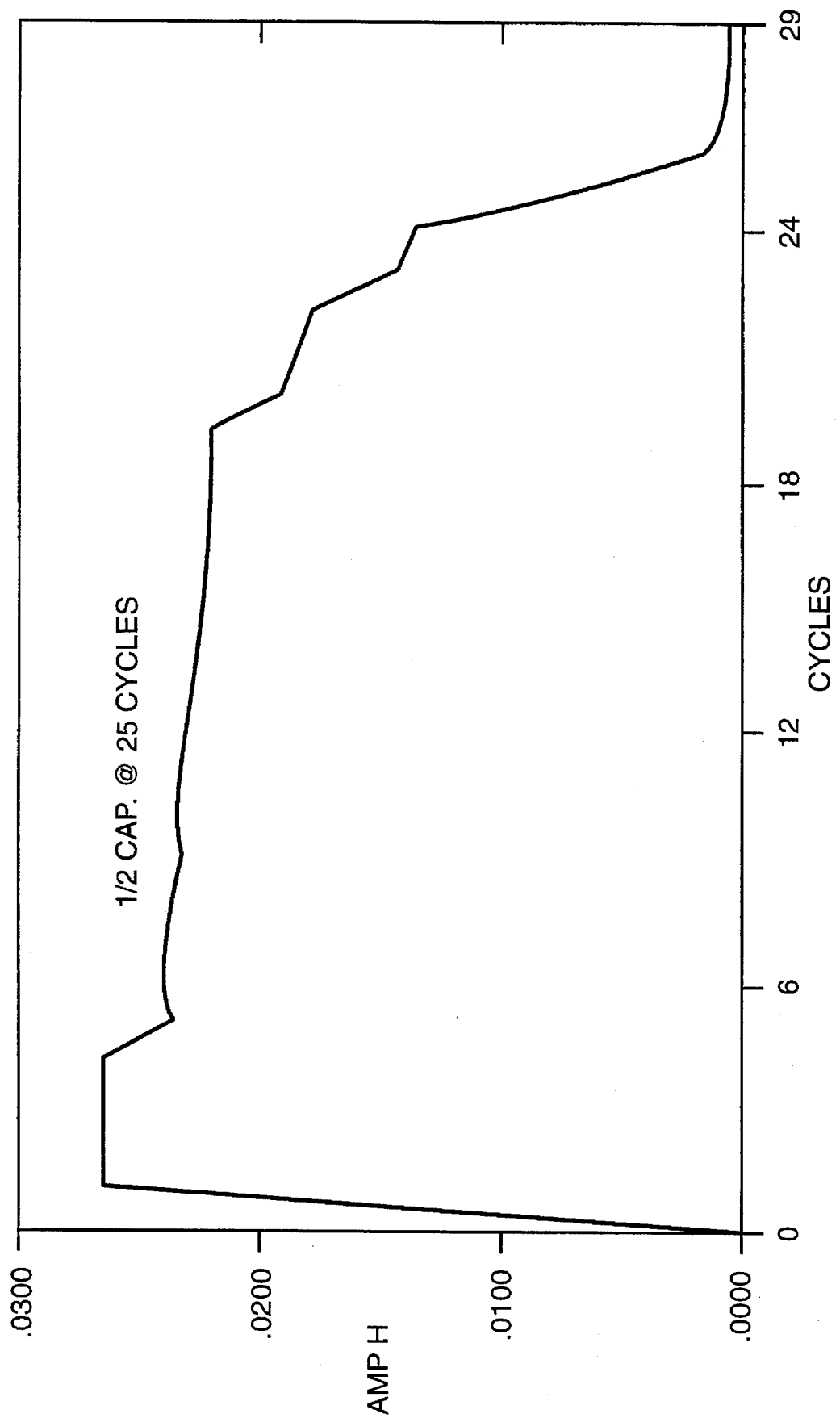
FIG._2

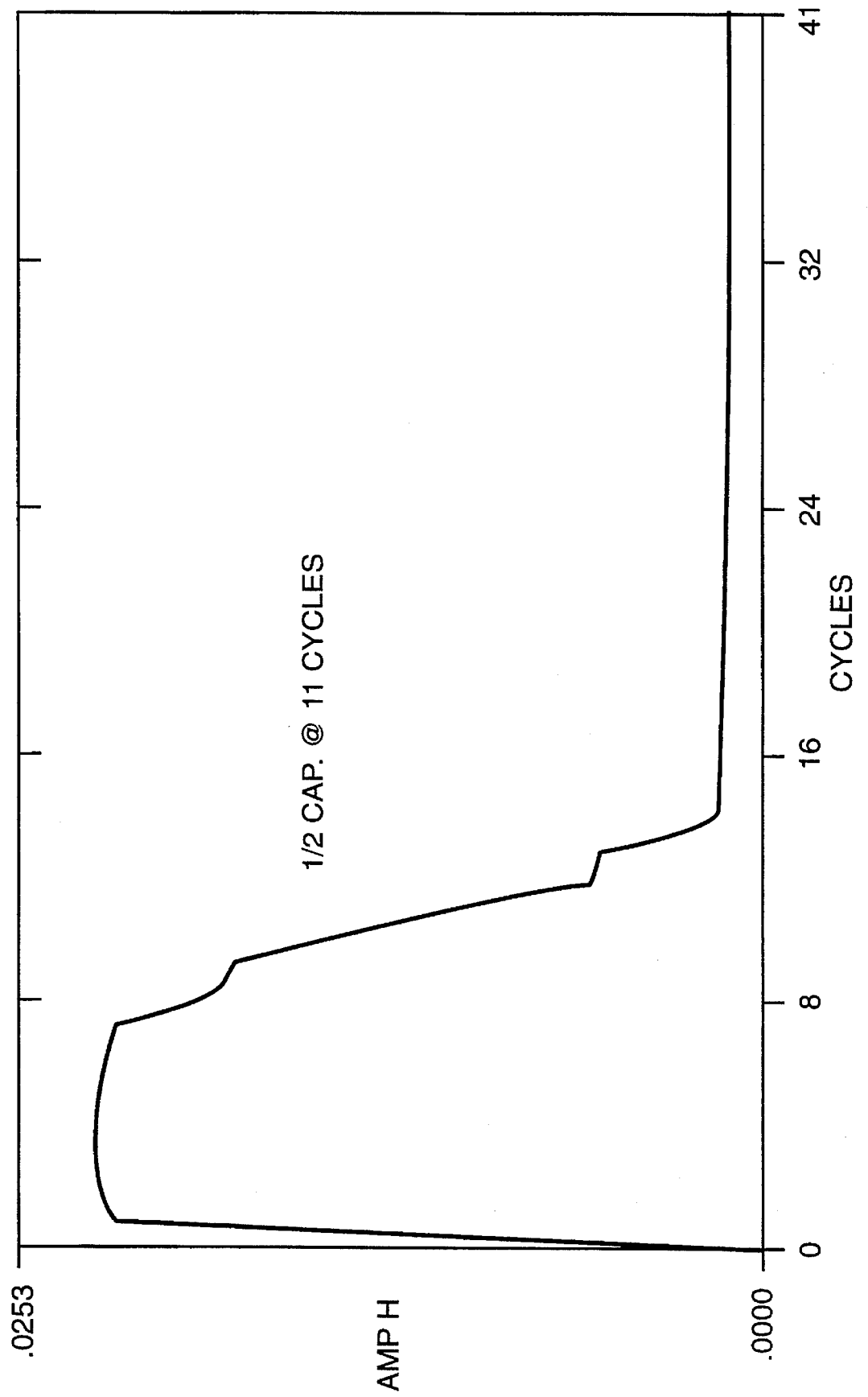
FIG._3

CHARGING REGIME FOR SECONDARY LITHIUM BATTERIES

BACKGROUND OF THE INVENTION

1. Field of the Invention

This invention is directed to methods for extending the cycle life of solid, secondary lithium electrochemical cells and batteries.

2. State of the Art

Electrochemical cells comprising an anode, a cathode, and a solid, solvent-containing electrolyte are known in the art and are usually referred to as "solid electrochemical cells". One class of solid electrochemical cells are the rechargeable (secondary) lithium cells which comprise a solid electrolyte interposed between a lithium anode and a compatible cathode suitable for recycling (recharging) the cell after discharge. The composition and method of making such electrochemical cells has been described in the patent literature, U.S. Pat. Nos. 4,830,939; 5,037,712; U.S. patent applications Ser. Nos. 07/918,438, filed Jul. 22, 1992, now U.S. Pat. No. 5,262,253; and 08/049,490, filed Apr. 19, 1993, now U.S. Pat. No. 5,300,375, each of which is incorporated herein by reference in its entirety.

A solid, secondary battery contains several solid, secondary electrochemical cells wherein the current from each of the cells is accumulated by a conventional current collector so that the total current generated by the battery is roughly the sum of the currents generated from each of the individual electrochemical cells employed in the battery. Such an arrangement enhances the overall current produced by the solid, secondary battery to levels which render such batteries commercially useful.

However, one problem encountered with the use of solid, secondary electrochemical cells in such batteries is the limited cycle life of the battery, i.e., the number of rechargings the battery can accept before the battery is no longer able to maintain acceptable levels of charge capacity. Specifically, the cycle life of the solid, secondary battery is related to the cycle lives of individual electrochemical cells comprising the battery. In general, when one of the electrochemical cells in the battery ceases to maintain acceptable levels of capacity, the battery must drain more current from the remaining electrochemical cells so as to produce the same overall level of current from the battery which results in a reduction of the capacity of the remaining electrochemical cells in the battery. This in turn results in a significant reduction in the cycle life of the cells and hence that of the battery.

Without being limited to any theory, it is believed that reduced cycle life in secondary lithium electrochemical cells containing a solid, solvent-containing electrolyte interposed between a lithium anode and a compatible cathode, arises, in pan, from lithium dendrite growth on the electrode surface during recharging of the discharged cell. Because the solid, solvent-containing electrolyte interposed between the lithium anode and the cathode is pliable, dendrite growth pushes aside this pliable electrolyte. Additionally, because dendrite growth is cumulative over repeated charging cycles, these growing dendrites will eventually contact the counter electrode resulting in microshorts in the electrochemical cell. This accumulation of microshorts eventually shorts the electrochemical cell thereby leading to termination of its cycle life for cells unable to accept charge. The situation is exacerbated by rapid charging procedures which serve to accelerate termination of the cells cycle life.

In view of the above, the an has been searching for charging methods, particularly rapid charging methods, which would prolong the cycle life of the cells and hence that of the battery.

SUMMARY OF THE INVENTION

This invention is directed, in part, to the discovery of methods which extend the cycle life of the solid, secondary lithium electrochemical cell. That is, methods which increase the ability of an electrochemical cell to retain at least one-half of its initial charge capacity over many charge-discharge cycles. This objective is obtained by the use of certain non-uniform charging currents.

In one of its method aspects the invention is directed to a method of rapidly charging a solid lithium secondary cell or battery to its initial charge capacity over many cycles through the use of a non-uniform charging current. In a solid lithium secondary cell battery which achieves an initial charge capacity, $Q_0$, and a cycle life $\eta_0$, under a slow constant current charging procedure; the invention is a method of rapidly charging the cell or battery while maintaining a cycle life of about $\eta_0$, through the use of a non-uniform charging current. More particularly, in a solid lithium secondary cell or battery which achieves an initial charge capacity, $Q_0$, by charging a constant current, $I_0$, over a time $T_0$, and having a cycle life of $\eta_0$; such that $Q_0 = SI_0T_0$, where S is the active surface area of the cell or battery; the inventive method of rapidly charging the secondary cell or battery to achieve a cycle life of about $\eta_0$, makes use of several charging currents, $I_k$ each applied for a time period $T_k < T_0$, such that $$Q_0 = S \sum_{k=1}^{m} I_k T_k$$

where k is an integer from 1 to m representing the time serial order of charging steps in a charging one-half cycle, and m is an integer greater than 1 representing the total number of charging steps in a charging one-half cycle. In the method of the present invention m is an integer preferably greater than about 3, more preferably greater than about 5, and most preferably greater than about 10. Preferably, all the time periods $T_k$ are approximately equal.

In one of its method aspects the present invention is directed to a method for extending the cycle life of a solid lithium secondary cell or battery which achieves an initial charge capacity of $Q_0$, by charging a constant current $I_0$, over a time $T_0$, and having a life cycle of $\eta_0$; such that $Q_0 = SI_0T_0$ where S is the active surface area of the cell or battery; the inventive method consisting of rapidly charging the secondary cell or battery to achieve a cycle life of about $\eta_0$, through the use of several charging currents $I_k$, each applied for a time period $T_k < T_0$, such that $$Q_0 = S \sum_{k=1}^{m} I_k T_k$$

where k is an integer from 1 to m representing the time serial order of charging steps in one charging one-half cycle and m is an integer greater than 1 representing the total number of charging steps in one charging one-half cycle, with the proviso that the m charging currents $I_k$ are distributed around the magnitude of an average charging current $\bar{I}$, where $\bar{I} > I_0$, such that $Q_0 = S\bar{I}\bar{T}$, where $\bar{T} < T_0$.

Preferably, the time periods $T_k$ are all approximately equal, and furthermore, $T_t$ equal $\overline{T}/m$. Preferably the magnitudes of the m charging currents $I_k$ are symmetrically distributed about $\overline{I}$, more preferably in time serial order, and most preferably in a linearly rising time serial order from the smallest current k=1, to k=2, etc. to the largest current k=m.

Alternatively, the magnitude of the m charging currents $I_k$ are normally distributed about $\overline{I}$ in time serial order, e.g., a gaussian distribution with the maximum current being $\overline{I}$.

Accordingly, in one of its method aspects, this invention is directed to a method for extending the cycle life of an electrochemical cell comprising a lithium anode, a compatible cathode and a solid, single-phase, solvent-containing solid electrolyte comprising a solid polymeric matrix, an inorganic ion salt, and an electrolyte solvent, wherein the solid electrolyte is interposed between the anode and the cathode. Accordingly, in one of its compositional aspects, this invention is directed to an electrochemical cell or battery whose cycle life has been extended pursuant to the method of the present invention.

BRIEF DESCRIPTION OF THE DRAWINGS

FIG. 1 illustrates the decline in charge capacity over many charge-discharge cycles, under standard testing conditions, of a cell charged at the same constant current in each cycle. The charge capacity of the cell is expressed in ampere hours.

FIG. 2 illustrates the decline in charge capacity over many charge-discharge cycles, under standard test conditions, of a cell more rapidly charged at the same non-uniform current in each cycle.

FIG. 3 illustrates the rapid decline in charge capacity over many fewer charge-discharge cycles, under standard test conditions, of a cell more rapidly charged at the same constant current in each cycle.

DETAILED DESCRIPTION OF PREFERRED EMBODIMENTS OF THE INVENTION

As noted above, this invention is directed to methods for extending the cycle life of solid, secondary electrochemical cells and batteries employing a lithium anode. However, prior to discussing this invention in further detail the following terms will first be defined.

Definitions

As used herein the following terms have the following meanings.

The term "a solid lithium secondary cell or battery" refers to a composite electrochemical cell comprising a lithium anode; a solid, solvent and inorganic ion-containing electrolyte; and a compatible cathode; which cell is capable of repeated charge-discharge cycles; and a battery comprising two or more such cells. Typically, the solid, solvent-containing electrolyte comprises a solid polymeric matrix hereinbelow defined.

The term "cycle" refers to a combined charge one-half cycle and a discharge one-half cycle, whereby the cell or battery takes in and stores electrical energy in a charge one-half cycle and releases electrical energy in a discharge one-half cycle.

The term "charge capacity" herein denoted Q, refers to the maximum charge measured in ampere hours, which the cell or battery is capable of achieving under the ambient charging conditions and procedures.

The term "cycle life", herein denoted $\eta$, is the number of cycles undergone by the cell under ambient charging conditions and procedures and repeatedly discharged under standard test conditions and procedures, until the charge capacity of the cell or battery has fallen to one-half Q.

The term "initial charge capacity", herein represented by $Q_0$, refers to the charge capacity of a fresh cell or battery which is slowly charged at a constant low current, herein denoted $I_0$. The charging time to achieve the initial charge capacity is denoted $T_0$. The units are: $Q_0$ is measured in ampere hours; $T_0$ is measured in hours; and $I_0$, actually a current density, is measured in amperes per square centimeter of active electrode surface. The active surface area of the cell or battery electrode is herein denoted S.

As a practical matter, the surface area of the lithium anode is the limiting "active surface area" of the cell. Typically, "low current" or "low current densities" for solid lithium secondary cells or batteries are those of about one-fourth amperes per square centimeter or less. A typical "slowly charged" lithium secondary cell or battery would require about six hours or more charging time. Conversely, a "rapidly charged" cell or battery would require about four hours or less of charging time, within the compositions and configurations of the electrochemical cells exemplified herein.

The term "standard cycle life", herein denoted $\eta_0$, is the number cycles undergone by a fresh cell or battery which is repeatedly slowly charged ($T_0$), at a constant low current ($I_0$), and repeatedly discharged under standard test conditions and procedures, until the charge capacity of the cell or battery falls to one-half $Q_0$.

The term "discharged under standard test conditions and procedures" refers to any discharge protocol. For example, for purposes of the present invention, the discharge protocol comprises six minutes of discharge at a current of 1.5 mA/cm$^2$ or until the voltage falls to 1.8 volts, followed by discharge for 54 minutes at 0.22 mA/cm$^2$ or until the voltage falls to 1.8 volts, whichever comes first.

The term "non-uniform charging current" or "non-uniform charging current density" refers to a charging current which varies in time.

The solid, solvent containing electrolyte comprises an electrolyte solvent, an inorganic ion salt, and a solid polymeric matrix.

The term "electrolyte solvent" (or "solvent") refers to the solvent (i.e., plasticizer) included in the composite electrode and the solid electrolyte for the purposes of solubilizing salts during operation of electrochemical cells which also may act as a plasticizer. The solvent can be any low volatile aprotic polar solvent. Preferably, these materials are characterized by a boiling point greater than about 85° C. In this regard, low volatility for the electrolyte solvent simplifies manufacture of the electrolyte and improves the shelf life of the resulting battery. Representative examples of suitable electrolyte solvents include, by way of example, propylene carbonate, ethylene carbonate, gammabutyrolactone, tetrahydrofuran, glyme, diglyme, triglyme, tetraglyme, dimethylsulfoxide, dioxylane, sulfolane, and the like, and mixtures thereof. A preferred solvent is a mixture of an organic carbonate and triglyme, with a 4:1 weight ratio mixture of propylene carbonate to triglyme being particularly preferred, as disclosed in U.S. patent application Ser. No. 07/918,509, filed on Jul. 22, 1992 which application is incorporated herein by reference in its entirety.

If the solid matrix forming monomer or partial polymer thereof employed in either of the solid electrolyte or the composite electrode is cured or further cured by radiation polymerization to form the solid matrix, the solvent should be radiation inert at least up to the levels of radiation employed. If the solid matrix forming monomer or partial polymer thereof is cured or further cured by thermal polymerization, the solvent should be thermally inert up to the temperatures of thermal polymerization. Additionally, the solvent should not scavenge free radials.

The term "inorganic ion salt" refers to any ion conducting inorganic salt which is suitable for use in a solid electrolyte. Representative examples are alkali metal salts of less mobile unions of weak bases having a large anionic radius. Examples of such anions are $I^-$, $Br^-$, $SCN^-$, $ClO_4^-$, $BF_4^-$, $PF_6^-$, $AsF_6^-$, $CF_3COO^-$, $CF_3SO_3^-$, etc. Specific examples of suitable inorganic ion salts include $LiClO_4$, $LiI$, $LiSCN$, $LiBF_4$, $LiAsF_6$, $LiCF_3SO_3$, $LiPF_6$, $Li[N(SO_2CF_3)_2]$, $Li[C(SO_2CF_3)_3]$, $NaI$, $NaSCN$, $KI$ and the like. The inorganic ion salt preferably contains at least one atom of Li, Na, K or Mg.

The term "solid polymeric matrix" or "solid matrix" refers to an electrolyte and/or composite electrode compatible material formed by polymerizing an inorganic or organic monomer (or partial polymers thereof) and which, when used in combination with the other components of the electrolyte or the composite electrode, renders the electrolyte or composite electrode solid. The solid matrix should be ion-conducting. Preferably, the solid matrix is capable of ionically conducting inorganic cations (e.e.g, alkali ions as defined above). When employed to form the electrolyte or the composite electrode, the solid matrix forming monomer is preferably polymerized in the presence of the alkali salt and the electrolytic solvent to form solid matrices which are suitable for use as solid electrolytes or composite electrodes in electrolytic cells.

Suitable solid polymeric matrices are well known in the art and include solid matrices formed from inorganic polymers, organic polymers or a mixture of polymers with inorganic non-polymeric materials.

Preferably, the solid polymeric matrix is an organic matrix derived from a solid matrix forming monomer and from partial polymers of a solid matrix forming monomer.

Alternatively, the solid polymeric matrix can be used in combination with a non-polymeric inorganic matrix. See, for example, U.S. Pat. No. 4,990,413 which is incorporated herein by reference in its entirety. Suitable non-polymeric inorganic materials for use in conjunction with the solid β-alumina, sliver oxide, lithium iodide, and the like. Suitable inorganic monomers are also disclosed in U.S. Pat. Nos. 4,247,499; 4,388,385; 4,414,607; 4,394,280; 4,432,891; 4,539,276; and 4,557,985 each of which is incorporated herein by reference.

The term "a solid matrix forming monomer" refers to inorganic or organic materials which in monomer form can be polymerized to form solid polymeric matrices. Suitable solid matrix forming monomers are well known in the art and the particular monomer employed is not critical.

Preferably, the solid matrix forming monomers contain hereto atom functionalities capable of forming donor acceptor bonds with lhe cations of the alkali salt so as to render the solid matrix ion-conducting (i.e., able to conduct the alkali cations). Ion-conducting hetero atom functionalities in solid polymeric matrices include, by way of example, ether groups, amine groups, and the like. On the other hand, non-conductive solid matrix forming monomers can also be used herein including, by way of example, monomers not containing hetero atoms and monomers containing non-conductive hetero atom functionalities such as carboxylic acid groups, sulfonic acid groups, and the like. The latter are non-conductive because they strongly bind the alkali cation.

Examples of suitable solid matrix forming monomers include, by way of example, ethyleneimine, ethylene oxide, epichlorohydrin, acryloyl-derivatized polyalkylene oxides (as disclosed in U.S. Pat. No. 4,908,283), urethane acrylate, vinyl sulfonate polyalkylene oxides (as disclosed in U.S. patent application Ser. No. 07/918,438 filed on Jul. 22, 1992 now U.S. Pat. No. 5,262,253 and incorporated herein by reference), acrylic acid ($CH_2=CHCOOH$), chloroacrylic acid ($ClCH=CHCOOH$), bromoacrylic acid ($BrCH=CHCOOH$), crotonic acid ($CH_3CH=CHCOOH$), propylene ($CH_3CH=CH_2$), ethylene ($CH_2=CH_2$) and the like as well as mixtures thereof.

Examples of suitable inorganic solid matrix forming monomers include, by way of example, phosphazines and siloxanes. Phosphazine monomers and the resulting polyphosphazine solid matrix are disclosed by Abraham et al., Proc. Int. Power Sources Syrup., 34th, pp. 81–83 (1990) and by Abraham et al., J. Electrochemical Society, Vol. 138, No. 4, pp. 921–927 (1991).

The term "a partial polymer of a solid matrix forming monomer" refers to solid matrix forming monomers which have been partially polymerized to form reactive oligomers. Partial polymerization may be conducted for the purpose of enhancing the viscosity of the monomer, decreasing the volatility of the monomer, and the like. Partial polymerization is generally permitted so long as the resulting partial polymer can be further polymerized to form solid polymeric matrices.

The term "prepolymer" refers to solid matrix forming monomers and/or partial polymers thereof.

The term "cured" or "cured product" refers to the treatment of prepolymers under polymerization conditions so as to form a solid polymeric matrix. The resulting cured product can include cross-linking between polymer backbones.

Suitable polymerization conditions are well known in the art and include by way of example, heating the monomer, irradiating the monomer with UV light, electron beams, etc. Examples of cured products suitable for use in this invention are set forth in U.S. Pat. Nos. 4,830,939 and 4,990,413 which are incorporated herein by reference in their entirety.

The solid matrix forming monomer or partial polymer can be cured or further cured prior to or after addition of the alkali salt and the electrolytic solvent. For example, a composition comprising requisite amounts of the solid matrix forming monomer, alkali salt and electrolytic solvent can be applied to a substrate and then cured. Alternatively, the solid matrix forming monomer can be first cured and then dissolved into a suitable volatile solvent. Requisite amounts of the alkali salt and electrolytic solvent can then be added. The mixture is then placed on a substrate and removal of the volatile solvent results in formation of a solid electrolyte. In either case, the resulting solid electrolyte is a homogeneous, single phase product which is maintained upon curing or evaporation, and does not readily separate upon cooling to temperatures below room temperature. Accordingly, the solid electrolyte of this invention does not include a separator as is typical of liquid electrolytes.

The term "lithium anode" refers to anodes comprising lithium, including by way of example, metallic lithium, lithium alloys, such as alloys of lithium with aluminum, mercury, zinc, and the like, and intercalation based anodes containing lithium such as those based on carbon, vanadium oxides, tungsten oxides, and the like.

The term "cathode" refers to an electrode containing a compatible cathodic material which functions as a positive pole (cathode) in a solid, secondary electrolytic cell and which is capable of being recharged (recycled) and which, when employed with the lithium anode, provides a fabricated electrolytic cell potential of at least about 2 volts. Such compatible cathodic materials are well known in the art and include, by way of example, manganese dioxide, molybdenum trioxide, vanadium oxides such as $V_6O_{13}$, $LiV_3O_8$, $V_2O_5$, and the like, sulfides of titanium, molybdenum and niobium, and the like, chromium oxide, copper oxide, $LiCoO_2$, $LiMnO_2$, etc. The intercalating chalocgenides of the transition metals are preferred.

The term "composite electrode" refers to cathodes and anodes wherein the cathode is comprised of materials other than cathodic materials and the anode is comprised of materials other than anodic materials. Typically, the composite contains a polymer which acts to bind the composite materials together. This polymer is derived from a solid matrix forming monomer or partial polymer thereof.

Composite cathodes are well known in the art. For example, a composite cathode can comprise a compatible cathodic material, a conductive material, an electrolytic solvent, an alkali salt, and a solid polymeric matrix which is derived from a solid matrix forming monomer or partial polymer thereof.

Composite anodes are also well known in the art. For example, a composite anode can comprise a compatible intercalation anodic material, an electrolytic solvent and a solid polymeric matrix which is derived from a solid matrix forming monomer or partial monomer thereof.

Methodology

The present invention is concerned with a novel charging regime for lithium secondary cells and batteries which serves to extend their cycle life, $\eta$, while using a shorter charging one-half cycle time, T.

In general, the novel method is concerned solely with the charging one-half cycle. Any standard test conditions and procedures may be used in the discharge one-half cycle to compare life cycles. For in practice, any discharge mode may be used in the discharge one-half cycle as required by the service to which the cell or battery is applied. In the following, particular charging and discharging procedures will be exemplified, but it is understood that such methods are only for purposes of illustration.

The novel method for rapidly charging a solid lithium secondary cell or battery while maintaining a cycle life of about $\eta_0$ relies on the use of a non-uniform charging current.

A particularly preferred non-uniform charging current is characterized by a time series of currents (or current densities) $I_1, I_2, I_3, \ldots I_m$, in general $I_k$, each of which is applied for respective time periods $T_1, T_2, T_3, \ldots T_m$, in general $T_k$, which the proviso that $T_k < T_O$. Furthermore, since the charging one-half cycle is less than the ideal slow charging period, it follows that $$\sum_{k=1}^{m} T_k < T_0$$

Preferably, the time series of charging currents, $I_k$, and the charging times $T_k$, for the charging one-half cycle are chosen such that; since $Q_0 = SI_0T_0$ has cycle life $\eta$; then $$Q = Q_0 = S \sum_{k=1}^{m} I_k T_k \text{ and } \eta = \eta_0$$

where the initial charge capacity $Q_0$, the active surface area of the cell or battery S, the constant low current $I_0$, and the long charging time $T_0$ have been heretofore defined as the typical charging parameters of a fresh cell or battery having cycle life $\eta_0$. m is an integer greater than 1, preferably greater than about 3, more preferably greater than about 5, and most preferably greater than about 10. Preferably, the time periods $T_k$ are all about equal.

In the practice of the present charging regimen, it is convenient to select the distribution of the magnitudes of the $I_k$ around a mean value denoted $\bar{I}$, such that $\bar{I} > I_0$. It follows that there is a time $\bar{T} < T_0$ such that $Q_0 = S\bar{I}\bar{T}$.

Preferably, the $T_k$ are all equal time intervals, and most preferably $T_k = \bar{T}/m$, where m is the aforementioned integer.

The preferred distribution of the magnitudes of $I_k$ is about the mean charging current $\bar{I}$, and more preferably is a symmetrical distribution about the mean current $\bar{I}$.

Preferably, and for the sake of simplicity, the distribution of the $I_k$ magnitudes about the mean is symmetrical in the time serial order denoted by the integer k, i.e., $I_1 < I_2 < I_3$ etc. up to $I_j = \bar{I}$ thereafter the $I_k$ may continue to ramp upwards to $I_m$ which will be of greatest magnitude in the set of $I_k$. In this case the currents are distributed upwardly in time and may be denoted as a "rising time serial order". The rising time serial order of $I_k$ magnitudes is preferably linear or geometric, more preferably linear, i.e., arithmetic, such that, for example, $I_k = I_{k-1} +$ increment.

However, the progression of the distribution of $I_k$ magnitudes beyond $\bar{I}$ may be of decreasing magnitude, again linearly or geometrically decreasing. Or the distribution of the $I_k$, as a whole, may resemble a normal or gaussian distribution of the $I_k$ about $\bar{I}$.

In a particularly preferred embodiment the composition of the lithium electrochemical cell is disclosed in U.S. patent application Ser. 08/049,212, filed Aug. 19, 1993.

Exemplification

In the following examples the same amount of charge is repeatedly given to identical cells, and the cells are repeated discharged in the same manner. But one charging regime combines the benefits of shorter charging time and high cycle life.

EXAMPLE 1

With reference to FIG. 1, consider a three electrode solid lithium secondary cell comprising a lithium foil anode sandwiched between cathode segments which surround both surfaces of the lithium foil, but are separated from the lithium by solid electrolyte. The cathode active material is $V_6O_{13}$. The solid electrolyte is composed of a cured urethane acrylate polymer, $LiPF_6$ conductive salt, polyethylene oxide, triglyme and propylene carbonate. such cells and their method of manufacture have been described in U.S. patent applications Ser. Nos. 07/918,509, filed Jul. 22, 1992 and 08/049,212, filed April 19, 1993, each of which is incorporated herein in its entirety. The active surface area is limited by the anode whose two surfaces provide 12.52 cm² of surface area.

In FIG. 1, the charging procedure for each cycle consists of a constant charging current density of 0.25 mA/cm² for 8.5 hours. A low current topping charging is applied to bring the cell voltage to 3.0 volts in each charging one-half cycle. Consequently, we can identify $I_0 = 0.25$ mA/cm², $T_0 = 8.5$ hours, S=12.52 cm², $Q_0 = 0.027$ Ah and $\eta_0 = 28$ for the S-cell.

In FIG. 1, and in subsequent examples, the discharge one-half cycles took place under standard test conditions and procedures consisting of a six minute constant current discharge at 1.5 mA/cm² (which is 0.0188 A for a surface of 12.52 cm²) or until the voltage fell to 1.8 volts. The initial discharge period was followed by a 54 minute constant current discharge at 0.3 mA/cm2 (which corresponds to 0.0028 A for a cell of surface area 12.52 cm²) or until the cell voltage fell to 1.8 volts whichever occurred sooner. Values were recorded at 12 minute intervals, or every 0.05 volts.

The S-cell of FIG. 1 was cycled through charge and discharge one-half cycles as heretofore described for a total 28 cycles before the cell charge capacity fell to one-half $Q_0$, i.e., $\eta_0=28$.

EXAMPLE 2

FIG. 2 represents the application of the present invention to a solid lithium secondary cell of the same composition as Example 1. With reference to FIG. 2, a S-cell having substantially reduced charging periods in each cycle was cycled through 25 cycles before the cell charge capacity fell to one-half $Q_0$, i.e., $\eta=25$. The cycle life of the cell of FIG. 2 is substantially the same as that of the cell of FIG. 1, i.e., $\eta=\eta_0$.

The present invention was applied to the cycling of the S-cell of FIG. 2 in the following manner. The charging one-half cycle parameters in each cycle were m=5, $T_k$=53 minutes, and consequently the sum of the $T_k$ was 4.42 hours, which is substantially less than $T_0$=8.5 hours.

The $I_k$ were symmetrically distributed about a mean $\bar{I}$=0.5 mA/cm² in a linearly rising time serial order, specifically, $I_1$=0.25 mA/cm², $I_2$=0.375 mA/cm², $I_3=\bar{I}$=0.5 mA/cm², $I_4$=0.625 mA/cm², and $I_5$=0.75 mA/cm², corresponding to increments of 0.125 mA/cm². The discharge one-half cycle was as described in Example 1.

EXAMPLE 3

FIG. 3 exemplifies the drawbacks of a rapid charge in the charging one-half cycle when the present invention is not utilized. In particular, FIG. 3 shows the effects of repeated charging one-half cycles at a constant current of 0.5 mA/cm² for 4.25 hours. The cell composition and discharge one-half cycles were as described in Example 1. The result shown in FIG. 3 is a lower charge capacity, Q, and a much shorter cycle life, $\eta$=11 cycles.

The advantages of this invention are evident from a comparison of Examples 1–3. The non-uniform changing current method of this invention exemplified in Example 2 provides the same cycle life as the slow charging method of Example 1, while charging in one-half the time and almost as rapidly as the fast charging method of Example 3. However, Example 3 illustrates that rapid charging by a uniform current provides a much shorter cycle life.

While the invention has been described in terms of various preferred embodiments, the skilled artisan will appreciate the various modifications, substitutions, omissions and changes which may be made without departing from the spirit thereof. The descriptions of subject matter in this disclosure are illustrative of the invention and are not intended to be construed as limitations on the scope of the invention.

What is claimed is:

1. A method of rapidly charging a discharged solid lithium secondary cell or battery, that has an active surface area S and that had an initial charge capacity $Q_0$ and cycle life $\eta_0$ prior to being discharged wherein $Q_0$ was established by applying a constant current $I_0$ over a length of time $T_0$ such that $Q_0=SI_0T_0$, which comprises the step of applying several charging currents, $I_k$, to the cell or battery wherein each $I_k$ is applied for a time period, $T_k<2T_0$, such that $$Q_0 = S \sum_{k=1}^{m} I_k T_k$$

where k is an integer from 1 to m representing the time serial order of charging steps in one charging one-half cycle, and m is an integer greater than one representing the charging steps in one charging one-half cycle.

2. A method according to claim 1 wherein m is an integer greater than 3.

3. A method according to claim 1 wherein m is an integer greater than 5.

4. A method according to claim 1 wherein m is an integer greater than about 10.

5. A method according to claim 1 wherein all the time periods $T_k$ are approximately equal.

6. A method according to claim 1 wherein the several charging currents, $I_k$, are applied so that the magnitude of the m charging currents are distributed about the magnitude of an average charging current $\bar{I}$ which is greater than $I_0$.

7. A method according to claim 6 wherein the time periods are all approximately equal and $\bar{T}_k$=T/M wherein $\bar{T}=Q_0 \div S\bar{I}$ and $\bar{T}<T_0$.

8. A method according to claim 6 wherein the magnitudes of the m charging currents $I_k$ are symmetrically distributed about $\bar{I}$.

9. A method according to claim 6 wherein the magnitudes of the m charging currents $I_k$ are symmetrically distributed about $\bar{I}$ in time serial order.

10. A method according to claim 6 wherein the magnitudes of the m charging currents $I_k$ are symmetrically distributed about $\bar{I}$ in linearly rising time serial order from k=1 to k=m.

11. A method according to claim 6 wherein the magnitude of the m charging currents $I_k$ are normally distributed about $\bar{I}$ in time serial order.

12. A method for extending the cycle life of a rapidly charged solid lithium secondary electrochemical cell or battery to its initial charge capacity over many cycles wherein said electrochemical cell comprises;

a lithium anode;

a compatible cathode; and a solid polymeric electrolyte interposed between said anode and said cathode, said electrolyte comprising an inorganic ion salt, a compatible electrolyte solvent and a solid polymeric matrix wherein the method comprises the steps of:

applying an initial current to the cell or battery; and increasing the current that is applied, wherein the so charged cell or battery has a life cycle that is substantially equal to $\eta_0$ wherein said electrochemical cell or battery has an active surface area S and had an initial charge capacity $Q_0$ that was established by charging said electrochemical cell or battery at a constant current $I_0$ over a time $T_0$, and had a cycle life of $\eta_0$; such that $Q0=SI_0T_0$; and wherein the method further comprises rapidly charging said secondary cell or battery to achieve a cycle life of about $\eta_0$, by the use of several charging currents $I_k$, each applied for a time period $T_k<T_0$, such that $$Q_0 = S \sum_{k=1}^{m} I_k T_k$$

where k is an integer from 1 to m representing the time serial order of charging steps in a charging half cycle and m is an integer greater than one representing the total number of charging steps in one charging half cycle.

13. A method according to claim 12 wherein m is an integer greater than about 3.

14. A method according to claim 12 wherein m is an integer greater than about 5.

15. A method according to claim 12 wherein m is an integer greater than about 10.

16. A method according to claim 12 wherein all the time periods $T_k$ are approximately equal.

17. A method according to claim 12 wherein the several charging currents, $I_k$, are applied so that the magnitude of the m charging currents are distributed around the magnitude of an average charging current $\bar{I}$ which is greater than $I_0$.

18. A method according to claim 17 wherein the time periods $T_k$ are approximately equal and $T_k = \bar{T}/m$ and wherein $\bar{T} = Q_0 \div S\bar{I}$ and $\bar{T} < T_0$.

19. A method according to claim 17 wherein the magnitudes of the m charging currents $I_k$ are symmetrically distributed about $\bar{I}$.

20. A method according to claim 17 wherein the magnitudes of the m charging currents $I_k$ are symmetrically distributed about $\bar{I}$ in time serial order.

21. A method according to claim 17 wherein the magnitudes of the m charging currents $I_k$ are symmetrically distributed about $\bar{I}$ in linearly rising time serial order from k=1 to k=m.

22. A method according to claim 17 wherein the magnitude of the m charging currents $I_k$ are normally distributed about $\bar{I}$ in time serial order.

23. A method of claim 12 wherein the lithium anode comprises an intercalation base anode comprising carbon.

24. A method of claim 17 wherein the cathode is selected from the group consisting of $LiV_3O_8$, $LiCoO_2$, and $LiMnO_2$.

* * * * *